3,743,685
ANTISTATIC THERMOPLASTIC POLYESTER COMPOSITION CONTAINING SULFONATED POLYOXYALKYLENE
Pierre Grosjean, Sainte-Foy-les-Lyon, and Yves Vaginay, Lyon, France, assignors to Societe Rhodiaceta, Paris, France
No Drawing. Filed July 9, 1971, Ser. No. 161,930
Claims priority, application France, July 9, 1970, 7026571
Int. Cl. C08g 39/10
U.S. Cl. 260—860   14 Claims

ABSTRACT OF THE DISCLOSURE

Antistatic thermoplastic compositions which have good resistance to soiling and can easily be shaped are disclosed, wherein the composition contains from 1 to 7% by weight of a sulfonated polyoxyalkylene having an average molecular weight above 500 and the general formula:

$$R\text{---}[\text{---}O\text{---}(CH_2)_m\text{---}SO_3M]_p$$

wherein R is a polyoxyalkylene radical having a molecular weight of Z and containing $n$ hydroxyl groups, $n$ is between 1 and 6, $p \leq n$ the degree of hydroxyl group blockage, expressed by the formula $$\frac{p \times 100}{n}$$

is greater than 80%, $Z/n$ is greater than 100, $m$ is 1 to 4, and M is an alkali or alkaline earth metal.

These compositions are useful for the manufacture of filaments, films, molded articles and the like.

BACKGROUND OF THE INVENTION

Polyester polymers are used for a wide variety of applications because of their excellent chemical and mechanical properties. However, polyesters display a decided tendency to acquire an electrostatic charge when rubbed, and such tendency causes a number of known practical difficulties, both as regards manufacturing operations and the treatment of polyester textile articles, such as garments, carpets and the like, and also as regards the use thereof. The prior art has attempted to remedy this decided disadvantage of polyesters by surface treatment of the polyesters, involving coating shaped polyester articles, to reduce the accumulation of static electricity. However, these treatments are, in the majority of cases, temporary. It is possible to render certain of the coatings produced by such treatments permanent by insolubilizing the coating on the shaped polyester articles, such as on fibers, but the resulting articles then display different, and many times undesirable, use characteristics, such as, for instance, with respect to appearance or handle. Also, while such surface treatments sometimes produce good results as regards the antistatic behavior of the polyester, the resulting articles, in many cases, have no improvement as to soiling resistance and in some cases the soiling resistance is actually reduced.

The prior art has attempted to prepare antistatic compositions from copolyesters produced from hydrophilic monomers and hydrophobic monomers, but in general a reduction of physical properties, such as tenacity, elongation and the like, will be found, relative to the physical properties of the corresponding hydrophobic polymers.

The prior art has also prepared antistatic compositions by incorporating into polymers of the polyamide or the polyester type, before or after polycondensation, minor amounts of alkylene polyethers in the form of a dispersed phase. Good results are obtained when this process is applied to polyamides but, however, inadequate results are obtained when this technique is applied to polyesters.

The prior art has also incorporated mixtures of polyoxyalkylene compounds and alkali or alkaline earth sulfonates into polyester polymers. For instance, French Pat. 1,526,402 discloses a polyester composition containing a polyalkylene ether and, in addition, an alkali or alkaline earth metal salt of an organic sulfonic acid. Such compositions, however, exhibit different migration rates for the different constituents, resulting in a separation of the constituents such that the additives can no longer perform in concerted action.

SUMMARY OF THE INVENTION

The present invention relates to thermoplastic compositions based on polyester polymers and sulfonated polyoxyalkylenes, which compositions are antistatic, have good resistance to soiling and can easily be shaped.

The antistatic compositions of the present invention contain at least one polyester, produced from at least one aromatic diacid and at least one diol, which has finely dispersed therein from 1 to 7% by weight of a sulfonated polyoxyalkylene. The sulfonated polyoxyalkylene is conveniently produced by reacting a polyoxyalkylene or alkyl polyalkylene oxide ether, preferably in the form of an alkali or alkaline earth alcoholate, with a lower alkyl sultone, such as propanesultone.

DESCRIPTION OF THE INVENTION

The antistatic compositions of the present invention exhibit good resistance to soiling and can be easily shaped into filaments, films, molded articles and the like. Such compositions contain at least one polyester which is the reaction product of at least one aromatic diacid and at least one diol, and dispersed in such polyester, in a fine and uniform form, from about 1 to about 7% by weight, based on the weight of the polyester, of a sulfonated polyoxyalkylene additive. The sulfonated polyoxyalkylene additive has an average molecular weight above 500 and is of the general formula:

$$R\text{---}[\text{---}O\text{---}(CH_2)_m\text{---}SO_3M]_p$$

wherein R is a polyoxyalkylene radical having a molecular weight of Z and containing $n$ hydroxyl groups, $n$ is between 1 and 6, $p \leq n$ the degree of hydroxyl group blockage, expressed by the formula $$\frac{p \times 100}{n}$$

is greater than 80%, $Z/n$ is greater than 100, $m$ is 1 to 4, and M is an alkali or alkaline earth metal.

Compared to prior art compositions prepared for the purpose of improving antistatic behavior and/or resistance to soiling of polyester polymers, the compositions of the present invention exhibit the following advantages:

They can be employed as a melt;

A single additive allows the simultaneous improvement of antistatic behavior and soiling resistance of the polyester;

Incorporation of a single product makes it possible simultaneously to improve the antistatic behavior and the resistance to soiling of the polyester;

The use of a single additive has several advantages over mixtures of additives, both as from a use viewpoint, wherein no prior mixing operation is required, and no hazard exists of the mixture separating, and the finished article viewpoint, wherein there is no danger of the components of the mixture separating because of different migration speeds through the polymer;

It is necessary to block the terminal hydroxyl groups of the polyoxyalkylenes in order to prevent interactions between such hydroxyl groups and the terminal acid groups of the polyester, which block is necessary if, for instance, mixtures of sulfonates and polyoxyalkylene compounds are used. In the additives of the present invention, the sulfonate groups block the terminal hydroxyl groups of the polyoxyalkylenes to make interactions thereof with the polyester practically impossible.

The polyester polymer is produced by polymerizing at least one aromatic diacid and at least one diol, as is known to the art. The polyester polymer may be of a wide range of molecular weights, but the molecular weight should be in the film-forming range. The polyester polymers disclosed in U.S. Pat. 2,465,319 may be used in the practice of the present invention. Copolyesters, as described in the aforesaid U.S. patent, may also be used. Polyalkylene terephthalate polymers are preferred and when the term "polyalkylene terephthalate" is used in the present specification and claims, it is to be understood to mean polymeric linear terephthalate esters formed by reacting an aliphatic glycol of the series $HO(CH_2)_yOH$, wherein $y$ is 2 to 10 inclusive or a cycloaliphatic glycol of the series

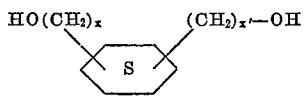

containing 8 to 14 carbon atoms, with terephthalic acid or a lower alkyl ester of terephthalic acid, wherein the alkyl group contains 1 to 4 carbon atoms, such as, for example, dimethyl terephthalate. The preparation of polyalkylene terephthalates is disclosed in U.S. Pat. No. 2,465,319 to Whinfield and Dickson, the disclosure of which is hereby incorporated by reference for the disclosure of polyalkylene terephthalates and process for making same therein. The more widely used and commercially important polyalkylene terephthalate material is polyethylene terephthalate, which is the most preferred polyester for the present invention. Polyethylene terephthalate is generally produced, as known to the art, by an ester interchange between ethylene glycol and dimethyl terephthalate to form bis-2-hydroxyethyl terephthalate monomer, which is polymerized under reduced pressure and elevated temperature to polyethylene terephthalate. Preferably, the polyalkylene terephthalate used in the practice of the present invention has a molecular weight of about 10,000 to about 100,000.

The sulfonate polyoxyalkylene may be obtained by reacting an alkyl sultone containing $m$ carbon atoms, such as, for instance, propanesultone or butanesultone, wherein $m$ has the above meaning, with a polyoxyalkylene compound containing hydroxyl groups, preferably with such hydroxyl groups in the form of alkali or alkaline earth alcoholates, or in the form of a partial alcohol/alcoholate mixture. The alkali metal is preferably sodium although other alkali metals, such as, for instance, potassium or lithium, or alkaline earth metals, such as, for instance, barium and calcium, may be used. The reaction will generally be at temperatures of 100 to 180° C. and pressures of 0.01 to 10 kg./cm.², preferably temperatures of 115 to 140° C. and at atmospheric pressure. This reaction can generally be illustrated by the following general equation:

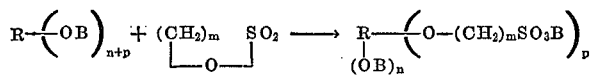

wherein R is a polyoxyalkylene radical, B is H, alkali metal or alkaline earth metal, and $m$, $n$ and $p$ are defined above; or, for example, by the following specific equation:

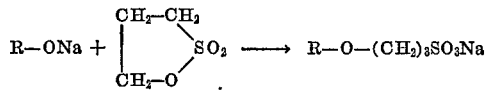

The alkali or alkaline earth metal alcoholates used in the above reaction can be prepared in accordance with various processes as known to the art. One convenient method of preparing such alcoholates consists of reacting a polyoxyethylene glycol with aqueous sodium hydroxide solution under reduced pressures, e.g. 0.1 to 10 mm. Hg, and an elevated temperature, e.g. about 140–about 170° C., with the water of reaction being removed at the rate at which it is formed. This reaction can be illustrated by the following equation, for the case of polyoxyethylene glycol:

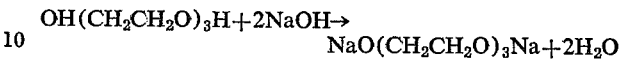

The polyoxyalkylene compound which is used to make the sulfonated polyoxyalkylene of the present invention may be:

(a) polyoxyalkylene glycol, wherein the alkylene radical contains 2 to 4 carbon atoms, having a molecular weight of about 400 or so up to 3500 or even higher, e.g. 10,000 or above. Mixtures of different oxyalkylene units may be in the same molecule such as, for instance polyoxypropylene "capped" with oxyethylene units, (b) an alkyl polyalkylene oxide ether, wherein the alkyl radical contains 1 to about 20 or more carbon atoms, and the alkylene radical contains 2 to 4 carbon atoms, having a molecular weight of about 400 to 6500 or even higher, e.g. 12,000 or above, produced by reacting alkylene oxide with an alkanol containing hydroxyl groups, including monofunctional alcohols containing 1 to about 20 carbon atoms, such as, for instance, butanol, heptanol, tridecanol, and the like, and polyfunctional alcohols such as, for instance, trimethylolpropane, sorbitol, pentaerythritol, glycerol, propylene glycol and the like. Preferably, the alkylene oxide will be ethylene oxide or propylene oxide. The reaction conditions of ethoxylation and propoxylation are well known to the art, see, e.g. Macromolecular Synthesis of Norman G. Gaylord, Vol. 3 edit.: Wiley and Sons (1968).

As described hereinabove, the polyoxyalkylene compound which is one of the starting ingredients in the production of the sulfonated polyoxyalkylene antistatic additives of this invention may contain 1 to 6 hydroxyl groups. All or a portion of these hydroxyl groups may be reacted with the alkyl sultone. If the sulfonated polyoxyalkylene molecule contains sulfonate groups and remaining, unreacted hydroxyl groups, the degree of hydroxyl group blockage will be expressed as a percentage by the formula:

$$\frac{100p}{n}$$

wherein $n$ and $p$ have the above meanings. The degree of hydroxyl group blockage should be greater than 80% preferably at least 90% and can even be as high as 100%.

The sulfonated polyoxyalkylenes described above are novel compounds and form another aspect of the present invention.

In the preparation of the antistatic compositions of the present invention, the sulfonated polyoxyalkylene additive may be introduced at various stages, such as, for instance, at the polyester polycondensation stage or in a mixer located in an intermediate stage of the polyester manufacture, or directly in melting apparatus for the formation, such as by extrusion, of shaped articles from the polyester. The sulfonated polyoxyalkylene additive should be in a fine, uniform form, conveniently in the form of inclusions of diameters between 1 and 10 microns, in the polyester.

Since the thermoplastic polyester compositions can be rendered antistatic by the use of 7% or less by weight of the sulfonated polyoxyalkylene additive, the softening point of the final composition and its behavior in the molten state are very close to that of the base polyester polymer. The composition can be used and/or shaped on devices and by the processes which are customarily used in the polyester field.

EXAMPLES

The invention will be understood more readily by reference to the following examples; however, these examples are intended to illustrate the invention and are not to be construed to limit the scope of the invention.

The abbreviations used in the following examples have the meanings set forth below:

MW=average molecular weight
IV=intrinsic viscosity, determined at 25° C. on a 0.5% strength weight/volume solution of polymer in orthochlorophenol.
MV=melt viscosity measured at 285° C. after drying the polymer for 3 hours 30 minutes at 150° C. in a ventilated oven in accordance with standard specification ASTM D 1238.
SP=softening point measured by penetration measurement in accordance with the priciple presented by O. B. Edgar and E. Ellery, J. Chem. Soc. 2633–2638 (1952).
RH=relative humidity of the atmosphere in which the tests are conducted.
COOH=number of carboxyl groups (—COOH) per metric ton of polymer.

PREPARATION OF SULFONATED POLYOXYALKYLENE ADDITIVE

EXAMPLE A

Polyoxyethylene-glycol of 3500 MW (1000 g.) and 97% strength NaOH (20.6 g.) were introduced into a 2 liter autoclave which had previously been purged by means of a nitrogen stream. The pressure in the autoclave was reduced to 2 mm. mercury; the polyoxyethylene was then melted at a temperature of 80° C., and the temperature of the reaction mixture was gradually raised, over a period of 2 hours, to 175° C. Water was distilled and removed from the autoclave for ½ hour, with the pressure remaining between 1.5–2 mm. Hg. The temperature was next lowered to 140° C. and propane sultone (63 g.) was introduced dropwise, with stirring, over a period of 30 minutes, into the alcoholate. After the propane sultone introduction was completed, the reaction mixture was kept at 140° C. for an additional 5 minutes with stirring. The reaction mixture was then allowed to cool to room temperature. The product obtained was whitish in color, crystalline, and started to melt at about 60° C.

EXAMPLE B

The condensate (MW=2500) of ethylene oxide and trimethylolpropane (2510 g. of condensate), 97% strength NaOH (123.7 g.) and water (150 g.) were introduced into a 4 liter autoclave which had been previously purged with nitrogen. The mixture was heated with stirring at a pressure of 4 mm. mercury for 60 minutes with the water formed being distilled off in vacuo. When the temperature reached 170° C. the reaction mixture lost its color and the formation of water ceased. The reaction mixture was maintained at 170° C. for one hour under a pressure of 4 mm. of mercury. The reaction temperature was then lowered to 130° C. and molten propane sultone (245 g.) was introduced into the autoclave with stirring. The resulting mixture was heated to 160° C. and held at that temperature for 15 minutes with stirring. Upon cooling to room temperature, the resulting product was obtained as a white crystalline solid.

EXAMPLE C

Finely divided metallic sodium (46 g.) and absolute methanol (1,000 cm.³) was introduced into a 2 liter autoclave and heated to the refluxing point. Thereafter, polyoxyethylene glycol of MW=1,500 (1,500 g.) was introduced in the molten state (60° C.). 750 cm.³ of methanol were removed by distillation, at which point toluene (2,000 cm.³) was introduced into the reaction mixture, and a methanol/toluene azeotrope was removed by distillation. During this azeotropic distillation, additional toluene (2,000 cm.³) was added to the reaction mixture. Then propane sultone (244 g.) dissolved in toluene (250 cm.³) was added to the reaction mixture, which was maintained under refluxing conditions for 1½ hours. The remaining toluene was evaporated by heating to a temperature of 140° C. and then the reaction product was dried in vacuo. 1500 g. of product were obtained which was very slightly yellow colored and had a melting point of 130–135° C.

EXAMPLE D

Example C was repeated but using a polyoxyethylene glycol of 600 MW and a reaction time of 1 hour 40 minutes at 185° C. under pressure of .3 mm. Hg.

EXAMPLE E

Example C was repeated but using, in place of the 1500 MW polyoxyethyleneglycol, oxyethylated polyoxypropylene (MW=1750) containing 70% by weight of propylene oxide.

EXAMPLE F

Example A was repeated, but using, in lieu of 3500 MW polyoxyethyleneglycol, oxyethylated polyoxypropylene (MW=6500) containing 50% by weight of ethyleneoxide.

EXAMPLE G

Example B was repeated, but using, in lieu of the 2500 MW condensate, oxyethylated tridecanol ($C_{13}H_{27}OH$) of 860 MW.

EXAMPLE H

Example B was repeated, but using, in lieu of the 2500 MW condensate, oxyethylated tridecanol ($C_{13}H_{27}OH$) of 596 MW.

EXAMPLE I

Example B was repeated, but using, in lieu of the 2500 MW condensate, oxyethylated tridecanol ($C_{13}H_{27}OH$) of 476 MW.

EXAMPLE 1

(Introduction of the antistatic additive into the autoclave.)

Dimethyl terephthalate (3298 g.), glycol (2266 g.), manganese acetate (1.521 g.), and trimethylolpropane (6.234 g.) were introduced into a trans-esterification flask. The trans-esterification reaction was carried out at 160–225° C. and a pressure of 1 kg./cm.² for 4 hours, and thereafter orthophosphorous acid (2.54 g.) was added to the reaction mixture. The polycondensation reaction was then carried out in a 7.5 liter autoclave in the presence of antimony oxide (1.320 g.) at a temperature of 287° C. and a pressure of 0.25 m./Hg. Excess glycol was thereafter gradually removed by distillation at 287° C. in vacuo. Thereafter, sulfonated polyoxyethylene of Example D (163.2 g.) was introduced, with stirring, via a locked chamber.

The resulting composition was transferred to an extruder and extruded at a temperature of 285° C. and a barrel pressure of 5 kg./cm.² in the form of a thin rod 4 mm. in diameter. The rod was cooled and cut into granules, which were thereafter dried, melted and extruded in a conventional melting-spinning apparatus. The resulting filament was then stretched by a factor of 360% of its original length, without using a size, in order to make a more accurate measurement of the intrinsic antistatic properties of the filament. The stretched filaments had a titer of 78 dtex for 23 strands.

A comparison filament was prepared using an identical procedure but without the sulfonated polyoxyethylene additive.

The antistatic properties of the filament of this sample was determined relative to that of the comparison filament by electrification by rubbing in a controlled atmosphere on a Rotschield Static Voltmeter R 1019, and the results are summarized in Table I below wherein each value represents the average of 10 measurements:

Hydrophilic property test

The diffusion time of a calibrated drop of distilled water on the knitted fabrics, treated in an identical manner, was measured. This test is defined in the Textile Manual of Textile Chemists and Colorists (1966, volume 42, page B 151) "Wettability Evaluation" Standard Test Method AATCC 39; 1952.

TABLE I

| Example | Characteristics of the polymer | | | Characteristics of the filaments | | Electrification by rubbing, RH=35% | Moisture uptake, RH=65% |
|---|---|---|---|---|---|---|---|
| | MV | IV | SP (° C.) | Tenacity (g./dtex) | A, percent (δ elongation) | | |
| 1 | 2,120 | 0.63 | 258.6 | 4.6 | 15.2 | −8 | 1.19 |
| Comparison | 2,600 | 0.62 | 262 | 4.88 | 20.3 | −150 | 0.29 |

EXAMPLES 2–7

(Introduction of the sulfonated polyoxyethylene antistatic additive during spinning.)

4% by weight, based on the weight of the polymer, of the condensation product, produced from propane sultone and a polyoxyalkylated derivative, of Examples A and E–I, respectively, were introduced into an extruder during the spinning of a molten polyethylene terephthalate. The polyethylene terephthalate was prepared using the method set forth in Example I. Extrusion was conducted at a temperature of 285° C. and a barrel pressure of 20 kg./cm.$^2$, with the resulting filaments stretched by a factor of 350% of their original length. The stretched filaments had a titer of 155± dtex for 25 strands.

A comparison filament, using the same polyethylene terephthalate, without the sulfonated polyoxyethylene added thereto, was prepared, under identical spinning and stretching conditions to those in the above examples, for comparative purposes.

Each filament was knitted, using the same kitting techniques, into a knitted sample and compared, with the results set forth on Table II below.

The tests conducted to determine the values reported on Table II were carried out as follows:

Half-discharge test

The knitted samples were charged to a potential of 100 volts by induction. The half-discharge time was measured in air at 22° C. and at the indicated relative humidity. The value reported in Table II was the average of 12 measurements.

Ash test

This qualitative test was carried out on the knitted fabric after rubbing the fabric briskly against a woven woolen fabric. The knitted fabric was immediately brought to within a distance of 5 cm. of sieved cigarette ashes, with the observation of whether the ashes were attracted or not and, if so, to what extent.

Oleophobic property test

A film of oil was placed on the knitted fabrics which were thereafter agitated in distilled water, and the ease with which the oil came away from the fabric was observed. In some instances, this test was conducted on samples which were washed the indicated number of times. A higher numerical value for oleophobic property represents greater ease of the separation of the oil from the knitted fabric.

Brightness test

This test is conducted on the TRILAC de LERES apparatus, using magnesium oxide as a reference. This test conforms to CIE normalisation (CIE: international commission of lighting). From an examination of Table II, it will be noted that, as regards the half-discharge time, the results obtained in Example 7 are only quite slightly improved relative to the comparison example. On the other hand, the results obtained for Examples 2–6 are at least six times better than the comparison sample. Specifically, Example 6, which differed from Example 7 primarily in using an oxyethylated alcohol having a molecular weight 120 greater than that used in Example 7, produced results which were remarkably better than the comparison sample. This suggests that the preferred molecular weight of the sulfonated polyoxyalkylene is above about 650.

As regards brightness, the results are generally improved, in all cases, even the comparative example, after one, and then after two, washes, but the improvement is much greater for the filaments based on the compositions of the present invention as compared to the comparison sample.

TABLE II

| Example | Nature of the base constituents of the adjuvant | Type of adjuvant used | Characteristics of the polymer composition | | Characteristics of stretched filaments | | | Half-discharge time in seconds | | | | | Surface resistance, MΩ |
|---|---|---|---|---|---|---|---|---|---|---|---|---|---|
| | | | IV | COOH | Gauge, dtex | Elongation, percent | Tenacity, g./dtex | Before washing | | After 5 washes | After 10 washes | After 20 washes | |
| | | | | | | | | RH: 65% | RH: 45% | RH: 65% | RH: 65% | RH: 65% | RH: 65% |
| 2 | Polyoxyethyleneglycol, MW 3,500 plus propane-sultone | A | 0.56 | 35 | 117.1 | 27.8 | 4.53 | 1,300 | 4,300 | 33 | 16 | 1,050 | 1,000,000 |
| 3 | Oxyethylated polyoxypropylene, MW 1,750, containing 70% by weight of propylene oxide, plus propane-sultone. | E | 0.56 | 35 | 116.8 | 25.0 | 4.54 | 6,100 | 6,300 | 133 | 126 | 348 | 584,000 |
| 4 | Oxyethylated polyoxypropylene, MW 6,500, containing 50% by weight of ethylene oxide, plus propane-sultone. | F | 0.54 | 33 | 115.7 | 27.8 | 4.44 | 2,900 | 3,200 | 111 | 69 | 218 | 424,000 |
| 5 | Oxyethylated $C_{13}H_{27}OH$, of MW 860 plus propane-sultone. | G | 0.51 | 33 | 113.6 | 22.8 | 4.19 | 2 | 2 | 2 | 2 | 2 | |
| 6 | Oxyethylated $C_{13}H_{27}OH$, of MW 596 plus propane-sultone. | H | 0.50 | 35 | 114.2 | 28 | 4.32 | 4 | 4 | 1 | 1 | 0 | |
| 7 | Oxyethylated $C_{13}H_{27}OH$, of MW 476 plus propane-sultone. | I | 0.52 | 37 | 113.9 | 28.5 | 4.56 | 12,500 | 18,000 | 640 | 8,787 | 4,729 | |
| Comp | Nil | | 0.62 | 36 | 117.8 | 20.3 | 4.88 | >30,000 | >30,000 | 8,944 | 9,200 | 14,660 | 2,950,000 |

| Example | Ash test | Hydrophilic character | | | Oleophobic character | | | | | | Brightness after— | | | Moisture uptake (percent by weight) |
|---|---|---|---|---|---|---|---|---|---|---|---|---|---|---|
| | | Unwashed | After 10 washes | After 20 washes | Unwashed article | | Article washed 10 times | | Article washed 20 times | | 0 wash | 1 wash | 2 washes | RH: 65 |
| | | | | | After 1 wash | After 3 washes | After 1 wash | After 3 washes | After 1 wash | After 3 washes | | | | |
| 2 | Not attracted. | | | | 85 | 95 | 75 | 85 | 70 | 80 | 42.6 | 73.4 | 76.2 | 0.96 |
| 3 | Slightly attracted. | | | | 70 | 90 | | | | | 43.5 | 67.2 | 71.8 | 0.96 |
| 4 | Not attracted. | | | | 70 | 90 | | | | | 40.7 | 66.2 | 69.5 | 0.85 |
| 5 | | 3 mins. 53 s. | 2 mins. | 3 mins. 17 s. | 90 | 95 | 90 | 95 | 80 | 90 | 45.6 | 74.2 | 80.0 | 1.20 |
| 6 | | 1 min. 4 s. | | 1 min. 25 s. | 85 | 95 | | | 50 | 80 | 45.4 | 73.8 | 77.0 | 1.10 |
| 7 | | | | | 70 | 80 | | | | | 45.4 | 64.8 | 63.5 | 1.10 |
| Comp | Strongly attracted. | >10 min. | >10 min. | >10 min. | 50 | 60 | 50 | 70 | 30 | 55 | 38.6 | 58.8 | 68.7 | 0.63 |

EXAMPLE 8

(Introduction of the additive in a mixer before molding.)

A polyester polymer was prepared in accordance with the process described in Example 4 of French Pat. 1,580,834, from terephthalic acid, 1,4-butane diol, and 0.4 mole percent of trimethylolpropane, the polyester having a melt viscosity of the order of 20,000 poises at 260° C. The polyester polymer was extruded in the form of a thin rod, which was thereafter cut into granules which were dried in air for two hours at 140° C.

The polyester polymer granules were then introduced into a V-type Moritz powder mixer. The sulfonated polyoxyalkylene of Example G (1% by weight, based on the weight of the polyester) was also introduced into the mixer. After mixing in the powder mixer for 10 minutes to produce a homogenized powder admixture, the admixture is molded by means of a screw injection molding machine into small slabs having dimensions of 50 x 50 x 2 mm.

A comparison sample was produced using the same materials and procedure, except the comparison sample did not have the sulfonated polyoxyalkylene therein.

The half-discharge times in seconds were compared, using the half-discharge test described above for Examples 2–7. For the comparison sample, the half-discharge time was greater than 10,000 seconds, while for the article of Example 8, the half-discharge time was 252 seconds.

It was furthermore noted that the molded articles of Example 8 did not attract dust, either during storage or during prolonged use, while the comparative sample did.

We claim:

1. Antistatic thermoplastic polyester composition having good resistance to soiling, said composition comprising at least one thermoplastic polyester polymer which is the reaction product of at least one aromatic diacid and at least one diol and, finely dispersed in said polymer, from about 1 to about 7% by weight, based on the weight of said polymer, of an additive consisting essentially of at least one sulfonated polyoxyalkylene, having an average molecular weight above 500, of the general formula:

$$R-[-O-(CH_2)_m-SO_3M]_p$$

wherein R is a polyoxyalkylene radical having a molecular weight of Z and containing $n$ hydroxyl groups, $n$ is between 1 and 6, $p \leq n$, the degree of hydroxyl group blockage, expressed by the formula $$\frac{p \times 100}{n}$$

is greater than 80%, $Z/n$ is greater than 100, $m$ is 1 to 4, and M is an alkali or alkaline earth metal.

2. The composition as claimed in claim 1, wherein said polyester is a polyalkyleneterephthalate.

3. The composition as claimed in claim 2 wherein said polyalkyleneterephthalate is polyethyleneterephthalate.

4. The composition as claimed in claim 1 wherein M is sodium.

5. The composition as claimed in claim 1, wherein $m$ is 3.

6. The composition as claimed in claim 1 wherein said polyoxyalkylene radical is selected from the group consisting of polyoxyethylene radicals, polyoxypropylene radicals, and mixtures thereof.

7. The composition as claimed in claim 6 wherein said polyoxyalkylene radical is a polyoxyethylene radical.

8. The composition as claimed in claim 1 wherein the sulfonated polyoxyalkylene has an average molecular weight above 650.

9. The composition as claimed in claim 1 wherein said polyoxyalkylene radical is an alkyl polyalkylene oxide ether, wherein said alkyl group contains about 1 to 40 carbon atoms and said alkylene group contains about 2 to 4 carbon atoms.

10. The composition as claimed in claim 9 wherein said alkyl polyalkylene oxide ether is the condensation product of a member selected from the group consisting of ethylene oxide, propylene oxide, mixtures thereof and an alkanol having from 1 to 6 hydroxyl groups and 1 to 40 carbon atoms.

11. The composition as claimed in claim 10 wherein said alkanol is a monohydric alkanol.

12. The composition as claimed in claim 10 wherein said alkanol is trimethylolpropane.

13. The composition as claimed in claim 1, wherein said at least one aromatic diacid is in the form of a lower alkylester wherein the alkyl group contains 1–4 carbon atoms.

14. Composition as claimed in claim 1, wherein said additive is in the form of inclusions of diameters between 1 and 10 microns in said polyester.

References Cited

UNITED STATES PATENTS

| | | | |
|---|---|---|---|
| 3,592,796 | 7/1971 | Trapasso et al. | 260—75 S |
| 3,637,900 | 1/1972 | Kimura et al. | 260—75 S |
| 3,502,607 | 3/1970 | Trapasso | 260—79.3 R |
| 3,243,455 | 3/1966 | Pizzini et al. | 260—513 R |
| 3,560,591 | 2/1971 | Tanaka et al. | 260—860 |
| 3,583,941 | 6/1971 | Trapasso et al. | 260—75 S |

OTHER REFERENCES

Caldwell, Def. Pub. of Ser. No. 767,845 filed October 1968, published in 862 O.G. 1010, on May 27, 1969, Defensive Publication No. T862,017.

WILLIAM H. SHORT, Primary Examiner

EDWARD WOODBERRY, Assistant Examiner

U.S. Cl. X.R.

260—75 S, T, 79.3 R, 513 R; Digest—15, 21